US011839887B2

(12) United States Patent
Kime

(10) Patent No.: US 11,839,887 B2
(45) Date of Patent: Dec. 12, 2023

(54) HYDRAULIC SPRAY NOZZLE FOR HYDROSEEDING SYSTEMS

(71) Applicant: DHG, Inc., Fairfield, OH (US)

(72) Inventor: Aaron Kime, Fairfield, OH (US)

(73) Assignee: DHG, INC., Fairfield, OH (US)

( * ) Notice: Subject to any disclaimer, the term of this patent is extended or adjusted under 35 U.S.C. 154(b) by 162 days.

(21) Appl. No.: 16/996,429

(22) Filed: Aug. 18, 2020

(65) Prior Publication Data

US 2021/0053076 A1 Feb. 25, 2021

Related U.S. Application Data

(60) Provisional application No. 62/889,200, filed on Aug. 20, 2019.

(51) Int. Cl.
*B05B 1/10* (2006.01)
*A01C 7/00* (2006.01)

(52) U.S. Cl.
CPC ................ *B05B 1/10* (2013.01); *A01C 7/004* (2013.01)

(58) Field of Classification Search
CPC .................................. B05B 1/10; A01C 7/004
See application file for complete search history.

(56) References Cited

U.S. PATENT DOCUMENTS 2,878,617 A 3/1959 Finn
3,310,237 A 3/1967 Welch
4,506,860 A * 3/1985 von Schwerdtner . F01D 17/145 251/118
4,522,504 A * 6/1985 Greverath ............. B01F 25/433 138/40
4,821,768 A 4/1989 Lett
5,012,974 A 5/1991 Johnson
5,060,867 A * 10/1991 Luxton ..................... F15D 1/08 431/9
9,185,840 B2 11/2015 Crivello
2017/0129605 A1 5/2017 Wu et al.
2019/0090407 A1 3/2019 Kime

OTHER PUBLICATIONS

International Preliminary Report on Patentability dated Mar. 3, 2022 in reference to co-pending patent Application No. PCT/US2020/046794 filed Aug. 18, 2020 (8 pages).
International Search Report and Written Opinion dated Nov. 26, 2020 in reference to co-pending patent Application No. PCT/US2020/046794 filed Aug. 18, 2020 (14 pages).
International Search Report and Written Opinion dated Sep. 6, 2021 in reference to related pending patent Application No. PCT/US2021/032900 filed May 18, 2021 (15 pages).

* cited by examiner

*Primary Examiner* — Steven M Cernoch
(74) *Attorney, Agent, or Firm* — Dinsmore & Shohl LLP

(57) ABSTRACT

A hydraulic spray nozzle, a hydroseeding system and a method of dispersing bulk material with a hydraulic spray nozzle. The hydraulic spray nozzle may further include one or more of an inlet, a diffuser cone, an expansion chamber, one or more interior surface vanes, a converging nozzle and an outlet that fluidly cooperate with one another in order to increase the dispersal distance of the bulk material as it exits the hydraulic spray nozzle. In one form, the hydraulic spray nozzle is incorporated into a hydroseeding system or other bulk material dispersing system in order to apply seeds, mulch, fertilizer or related bulk materials over large swaths of land.

15 Claims, 4 Drawing Sheets

HYDRAULIC SPRAY NOZZLE FOR HYDROSEEDING SYSTEMS

This application claims priority to U.S. Provisional Application 62/889,200, filed Aug. 20, 2019.

TECHNICAL FIELD

The present specification generally relates to nozzle systems for planting processes and, more specifically, hydraulic spray nozzle systems for spreading seed and fertilizers with hydroseeding processes.

BACKGROUND

Hydroseeding is a planting process that involves the spreading of a slurry of seed and mulch. The process is often used as an erosion control technique on construction sites as an alternative to the traditional process of broadcasting or sowing dry seed. The hydroseeding slurry is transported in a tank, typically either truck-mounted or trailer-mounted, and sprayed over prepared ground with a spray nozzle.

A typical spray nozzle 1, such as that which is described in U.S. Pat. No. 2,878,617 and shown generally in FIG. 1, are conically shaped and adapted for spraying the slurry long distances. The cross-sectional area A associated with such conical shape reduces in a linear, constant manner over nearly the entire length L of the spray nozzle 1. Such a configuration allows for any tangential velocity component (that is to say, swirl-like) to persist within the flowing slurry that continues upon discharge, particularly in view of the tangential flow components already present in the pumped slurry that is downstream of the multiple pipe bends (elbows) typical in the boom swivels of a hydroseeder. If allowed to persist, these tangential velocity components within the slurry flow, upon exiting the nozzles, create a centrifugal effect on the free stream. This centrifugal effect is detrimental to stream coherence and reduces overall stream distance. Moreover, the long cylindrical shape of the outlet O of spray nozzle 1 creates a highly parabolic velocity profile in the slurry. When the slurry exits the nozzle, this axial shear imparted by this parabolic velocity profile causes flow separation around the outer perimeter annuli of the stream increasing its cross-sectional area, which, in turn, causes greater drag on the stream as it travels through the air. The stream breaks down into separate droplets rapidly and the coherence of the stream is lost, resulting in reduced spray distance.

Accordingly, a need exists for alternative hydraulic spray nozzle systems for hydroseeding applications that overcome the problems presented by conventional spray nozzles.

SUMMARY

In one aspect the present disclosure, a hydraulic spray nozzle is disclosed. The hydraulic spray nozzle may include an adapter that mates the hydraulic spray nozzle to a piping run for the dispersal of a slurry or other bulk material. The hydraulic spray nozzle may be configured to spray any bulk material including, but not limited to, aqueous slurries typically employed during hydroseeding and that may comprise one or more of mulch, soil, soil amendments (such as bat guano, manure, worm compost, greensand or the like), fertilizer, seed, water, as well as other ingredients. Regardless of which embodiment is chosen, the hydraulic spray nozzle as described herein is capable of creating a more uniform velocity profile of the bulk material as it passes through the hydraulic spray nozzle in the flow direction. This increased uniformity of the velocity profile promotes an increased discharge coherence and resulting dispersal distance compared to traditional nozzles.

In another aspect the present disclosure, a hydroseeding system is disclosed. The assembly includes a hydraulic spray nozzle and one or more additional components. By way of example, such additional components may include one or more of a discharge boom and a bulk material dispersing system that may include one or more of a motor, pump, discharge boom and raw material (that is to say, slurry) tank.

In yet another aspect the present disclosure, a method of dispersing bulk material with a hydraulic spray nozzle is disclosed. The method includes configuring a bulk material dispersing system that upon operation thereof pressurizes a bulk material to promote flow of the bulk material through fluid-conveying piping that forms a portion of the bulk material dispersing system, and fluidly coupling a hydraulic spray nozzle to the bulk material dispersing system. The hydraulic spray nozzle includes a series of components including at least a diffuser cone, an expansion chamber and at least one vane the latter of which is disposed within at least one of the diffuser cone and the expansion chamber and a converging nozzle. By conveying the bulk material through the hydraulic spray nozzle, a tangential component of the flow of the bulk material therethrough is reduced and the velocity profile is nearly uniform upon exit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
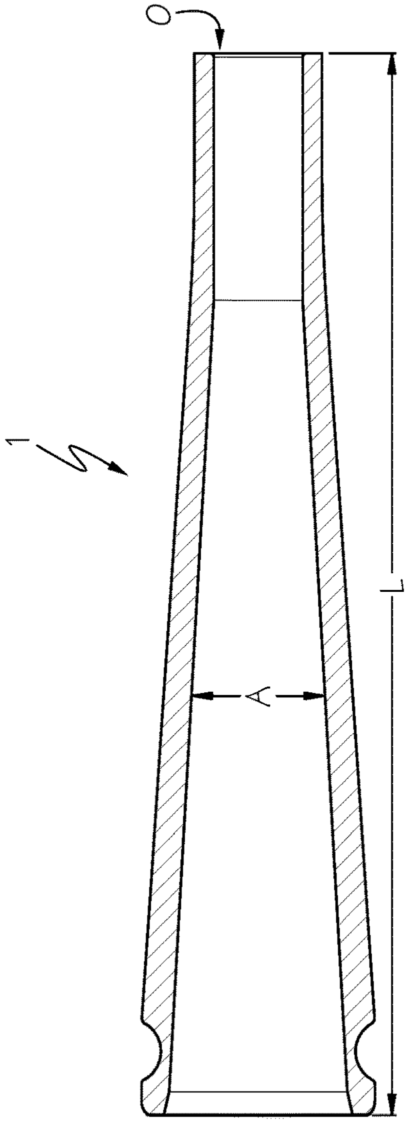
FIG. 1 depicts a cross-sectional view of a conventional hydraulic spray nozzle according to the prior art.
Figure 2:
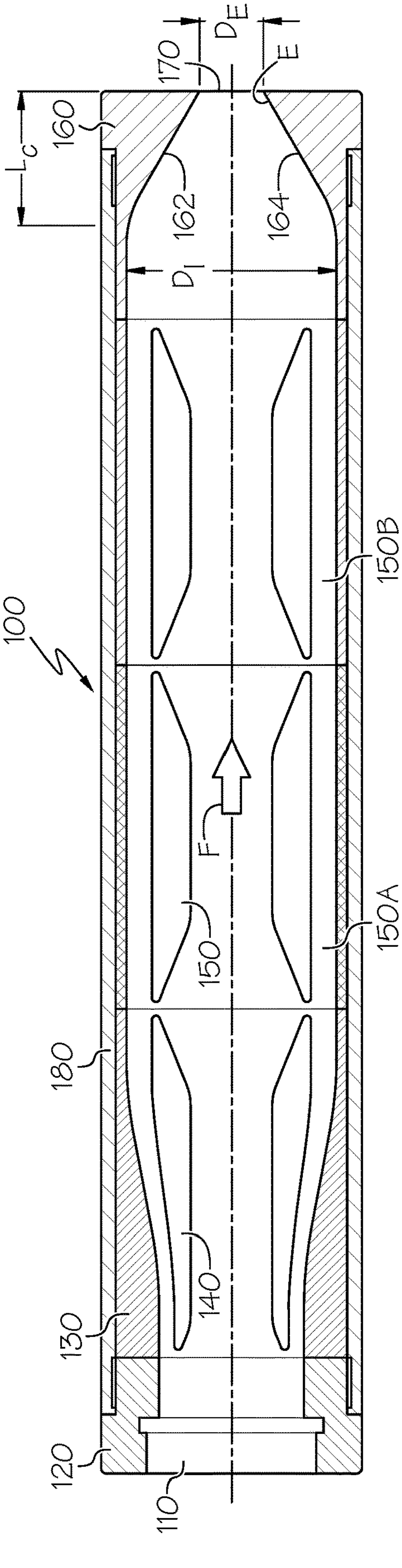
FIG. 2 depicts a cross-sectional view of the hydraulic spray nozzle, according to one or more embodiments shown and described herein.
Figure 3:
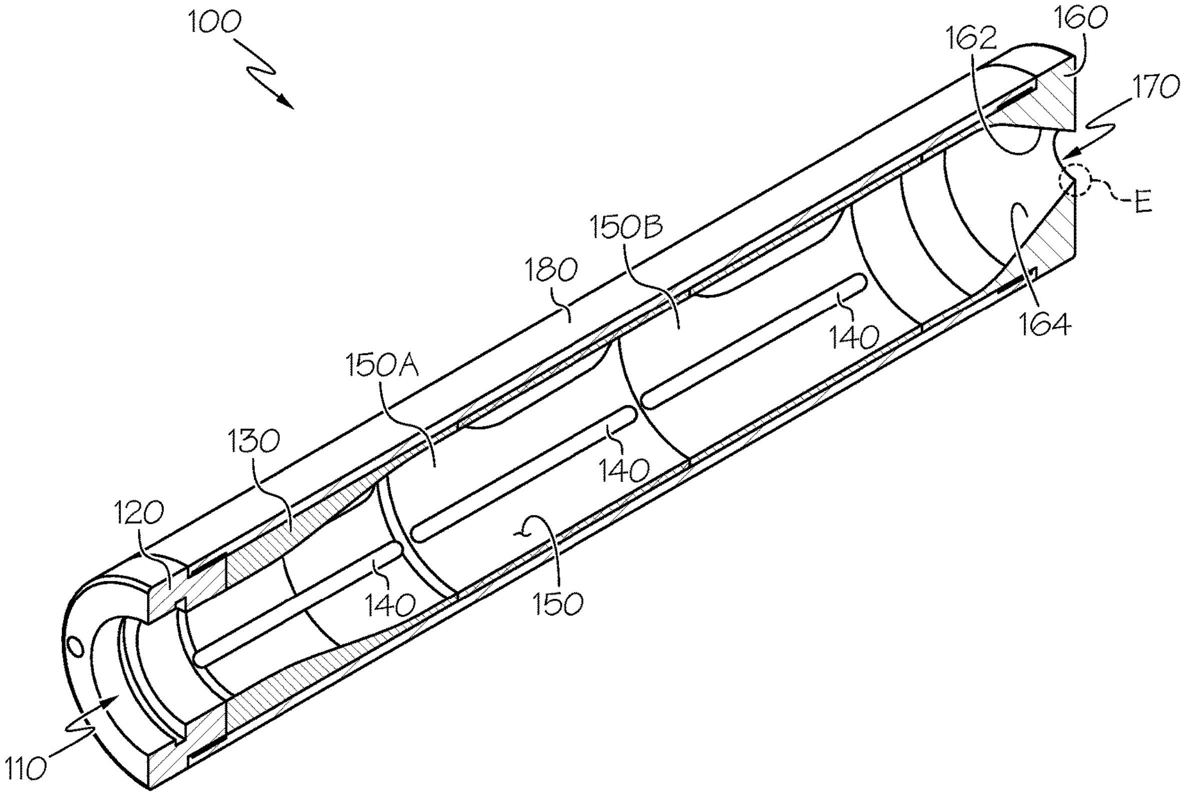
FIG. 3 depicts an isometric view of the hydraulic spray nozzle, according to one or more embodiments shown and described herein.
Figure 4:
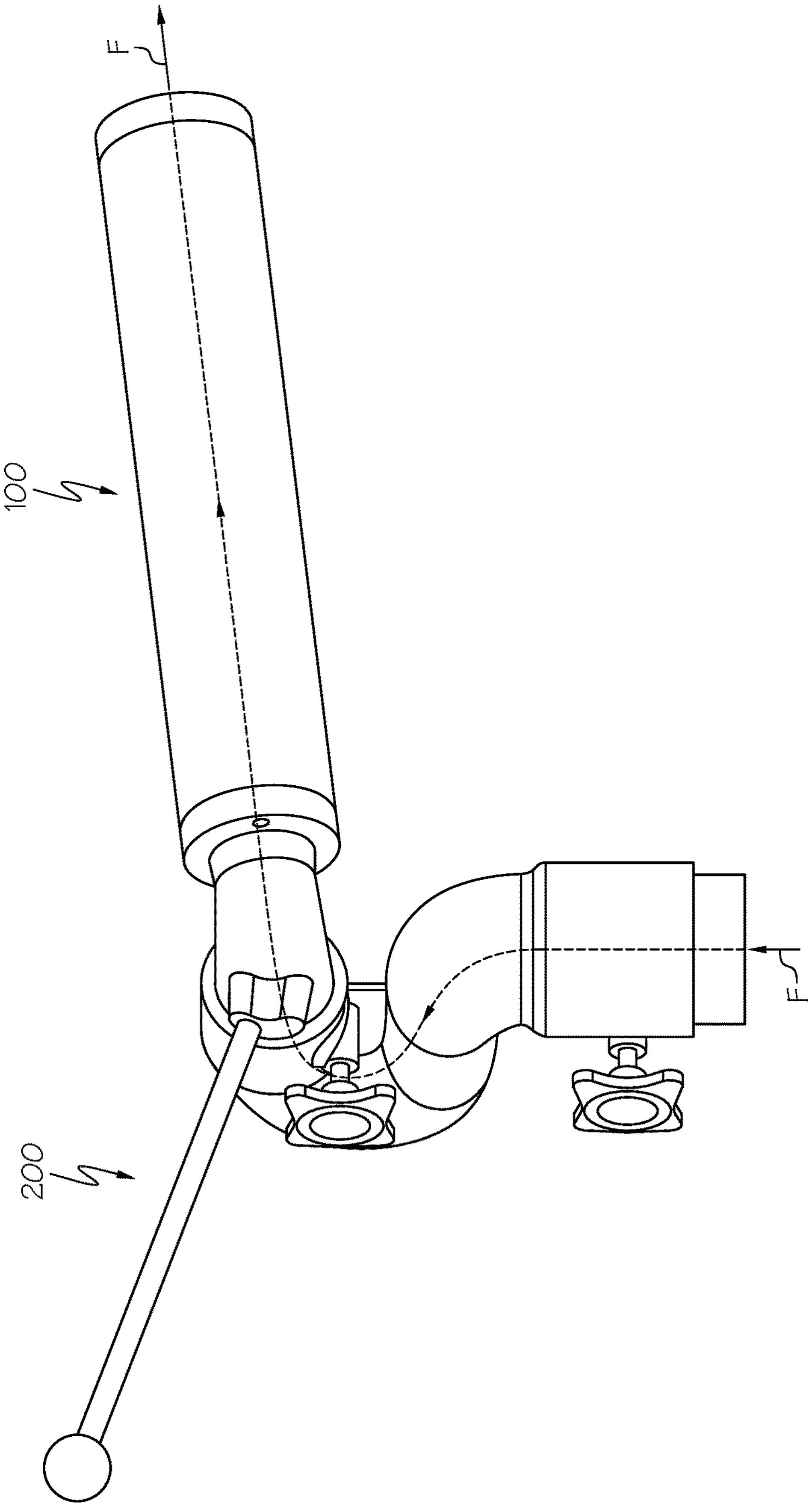
FIG. 4 depicts the hydraulic spray nozzle, according to one or more embodiments shown and described herein, mounted on a hydraulic spray nozzle monitor.

Referring generally to FIGS. 2 through 5, one embodiment of a hydraulic spray nozzle 100 for hydroseeding purposes is shown in FIGS. 2 and 3, along with a discharge boom 200 (also referred to as a spray nozzle monitor, as shown in FIG. 4) and a bulk material dispersing system (presently shown in FIG. 5 in the form of a hydroseeding system) 300.

Referring with particularity to FIG. 4, the hydraulic spray nozzle 100 may be fluidly coupled to the discharge boom 200 in order to act as the final point of slurry (or other bulk material, none of which are shown) dispersal. In one form of operation, the bulk material that is stored in the bulk material dispersing system 300 and pressurized to be routed through the pivotable discharge boom 200 is then dispersed through the hydraulic spray nozzle 100, typically over broad areas.

Figure 5:
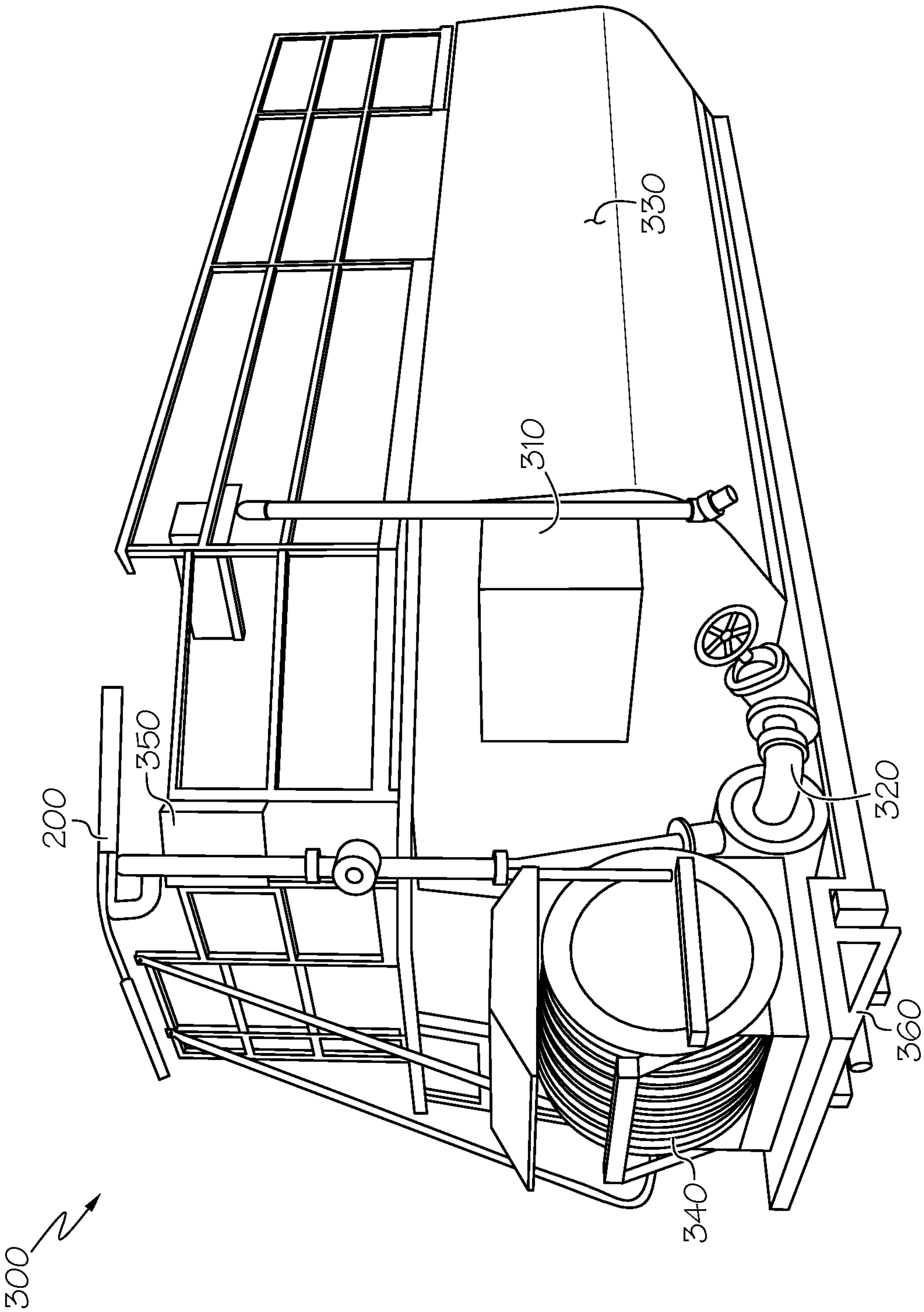
FIG. 5 depicts one form of a bulk material dispersing system that may be used along with the hydraulic spray nozzle according to one or more embodiments shown and described herein.

Referring with particularity to FIG. 5, in one form, the bulk material dispersing system 300 may be self-contained on its own dedicated vehicular platform to include tower-based spraying capability, while in another (not shown) removably mounted on a trailer, pallet or stand. It will be appreciated that regardless of the configuration of the bulk material dispersing system 300, it may be used in conjunction with the hydraulic spray nozzle 100 that is disclosed herein and that all such variants are within the scope of the present disclosure. The bulk material dispersing system 300 may in one form include a motor (not shown, but for example, a gasoline-powered motor, a diesel-powered motor, an electric motor or the like), a hydraulic reservoir 310, pump (for example, a centrifugal pump) 320, raw material tank 330, as well as an optional hose and reel 340 that may form a means of discharging slurry. In the alternative, the discharge boom 200 of FIG. 4 may serve as the point of slurry discharge.

The bulk material dispersing system 300 may additionally include a controller (including programmable variants) 350, as well as ancillary equipment (not shown) that may include a clutch, agitator, oil pump, valves, piping, containers or the like. For example, valves and piping may form part of a piping system that fluidly connects the pump discharge to both the boom 200 and the hose, depending on which of the valves are opened or closed. Likewise, the controller may be made to cooperate with actuators, solenoid-driven devices, valves or the like in order to regulate operation of one or more of the components disclosed herein. In one form as shown, all of these and remaining components that make up the bulk material dispersing system 300 may be supported by a frame 360 or related structure. When configured as a hydroseeding system, the bulk material dispersing system 300 may include various attributes or components such as those sold commercially by the Assignee of the present disclosure, including the T330 Super HydroSeeder®, the T400 Super HydroSeeder®, the T170 HydroSeeder®, the LF120 HydroSeeder®, the T120 HydroSeeder®, the T90 HydroSeeder®, the T75 HydroSeeder®, the T60 HydroSeeder®, the T30 HydroSeeder®, the Titan HT330 HydroSeeder® and the Titan HT400 HydroSeeder.

Referring with particularity to FIGS. 2 and 3, the hydraulic spray nozzle 100 disclosed herein both reduces tangential velocity components in the stream as much as possible and creates a linear velocity profile (that is to say, a plug-like flow) at its exit. These changes, either separately or in combination, act to increase free stream coherence and hence, discharge stream distance. The hydraulic spray nozzle 100 defines an internal flowpath along a flow direction F and that is formed by various components, including an inlet 110, an adapter 120, a diffuser cone 130, one or more vanes 140, an expansion chamber 150, a converging nozzle 160, an outlet 170 and an optional outer tube 180 that are all fluidly coupled to one another. In another form (not shown), the separate outer tube 180 is instead included as part of an integral construction such that it, along with the adapter 120, diffuser cone 130 and one or more vanes 140, are fabricated from a single, unitary piece. In one form, such integral construction may be made from an aluminum extrusion or the like. Optionally in such form, one or both of the expansion chamber 150 and converging nozzle 160 may also be integrally formed along with the adapter 120, diffuser cone 130 and one or more vanes 140.

As shown, the inlet 110 is fluidly coupled upstream by the adapter 120 to a piping run that in one form is a part of the pivotable discharge boom 200 of FIG. 4 that in turn is connected to an additional piping run of the bulk material dispersing system 300 of FIG. 5 that in turn forms fluid continuity with other piping or conduit that is used to convey the bulk material within and through the bulk material dispersing system 300. It will be appreciated that the term "piping run" may include any or all such conduit that is used for such conveyance.

Upon entering the hydraulic spray nozzle 100 from the discharge boom 200, the bulk material experiences an increase in flowpath cross-sectional area as it passes from the inlet 110 and adapter 120 and into the diffuser cone 130. In configurations where the flowpath defines a generally axisymmetric cross-sectional area, it will be appreciated that it is the diameter of the diffuser cone 130 that increases in a flow direction F (e.g., from the inlet 110 to the outlet 170) of the bulk material. In one form, the diffuser cone 130 increases the cross-sectional area of the flowpath in a non-linear, non-constant manner along the flow direction F. Without being bound by theory, it is believed that increasing the diameter of the diffuser cone 130 in the flow direction in a gradual—and in particular, non-linear—manner, the average velocity of the bulk material decreases as it moves through the hydraulic spray nozzle 100 in the flow direction F in such a way to avoid (or at least smooth out) abrupt angle changes and related flow discontinuities in how the bulk material makes its way toward the outlet 170; such avoidance reduces flow separation, friction, turbulence and other anomalies that may adversely affect the quality of flow being discharged through the hydraulic spray nozzle 100.

Regardless of what shape is defined by the increase in cross-sectional area, and assuming that the bulk material exhibits generally incompressible properties, the generally diverging shape acts to reduce the overall velocity of the bulk material as it proceeds along the flow direction F, while increasing its static pressure. Significantly, both the radial components of the flow velocity and the standard deviation of the bulk material's axial component also experience a reduction. This in turn promotes the formation of a jet of bulk material with a cross-sectional flow velocity that is as close to uniform as possible, and correspondingly helps keep the likelihood of flow stagnation area and resulting eddy flow formation low as a way to ensure high flow coherence, even upon discharge. Without being bound by theory, it is believed that the wall boundary layer is also minimized, thereby reducing turbulence losses.

Although discussed in conjunction with the diffuser cone 130, it will be appreciated that the design of the hydraulic spray nozzle 100 may further reduce flow separation, slurry turbulence or tangential flow due to the smooth transitions between one or more of its various components disclosed herein. Thus, the combined effect of the diffuser cone 130 and expansion chamber 150 is such that the average flow velocity is reduced, which in turn promotes the formation of a more uniform velocity profile. As such (and by way of example), the transition surfaces between one or both of the diffuser cone 130 and the expansion chamber 150 are gradually sloped, thereby creating a smooth transition as a way to avoid or at least reduce the likelihood of forming a parabolic velocity profile within the bulk material as it passes through the hydraulic spray nozzle 100.

The one or more vanes 140 may be oriented generally within the flowpath along the flow direction F, and in configurations where there is more than one vane 140 present, they may be disposed circumferentially about a flowpath centerline. As shown, at least a portion of each of the vanes 140 may be situated within a portion of the flowpath that corresponds to the diffuser cone 130. Likewise as shown, at least a portion of each of the vanes 140 may be situated within a portion of the flowpath that corresponds to the expansion chamber 150. Moreover (not shown), at least a portion of each of the vanes 140 may be situated within a portion of the flowpath that corresponds to the converging nozzle 160. Furthermore as shown, at least a portion of each of the vanes 140 may be situated within a portion of the flowpath that corresponds to any or all of the diffuser cone 130, the expansion chamber 150 and the converging nozzle 160 such that by such situation they define a partial radial profile. Within the context of the present disclosure, the term "partial radial profile" means that the one or more vanes 140 do not project in a radially inward manner all of the way to the centerline of the flowpath of the hydraulic spray nozzle 100. Without being bound by theory, it is believed that the partial radial profile of the vanes reduces unwanted tangential flow (that is to say, swirl) of the bulk material as it moves through the hydraulic spray nozzle 100 in the flow direction F, particularly in view of the tangential flow components already present in the pumped slurry that is downstream of the multiple pipe bends (elbows) that are typically present in the boom swivels of a hydroseeder. As a result, loss in fluid momentum and related energy, which is common in typical nozzles, may be reduced or eliminated, thereby increasing the homogeneity of the bulk material composition and its dispersal distance as it exits through the outlet 170. Further, since the partial radial vanes 140 do not breach the centerline of the hydraulic spray nozzle 100, clogging of the hydraulic spray nozzle 100 becomes less likely. Such partial radial vanes 140 are especially desirable when the bulk material comprises a thick or fibrous composition where clogging could otherwise be expected. In a similar manner, one or more of vane 140 placement (that is to say, at least one of positioning and orientation within the flowpath), length and hydrodynamic profile may be varied within one or all of the diffuser cone 130 and expansion chamber 150 and the converging nozzle 160 in order to achieve similar tangential flow reduction results. It will be appreciated that all variations of vane 140 configuration and placement—both shown within FIGS. 2 and 3, as well as the variants not shown—are deemed to be within the scope of the present disclosure.

Whereas the diffuser cone 130 may have an increasing cross-sectional area along the flow direction F, the expansion chamber 150 may have a constant cross-sectional profile. As such (and within the context of a generally axisymmetric flowpath), the maximum diameter of the diffuser cone 130 may be equivalent to the diameter of the expansion chamber 150. Moreover, in one form, the diameter of the expansion chamber 150 is greater than that of the piping run (not shown) that feed the bulk material to the hydraulic spray nozzle 100. Without being bound by theory, it is believed that maintaining the increased diameter within the expansion chamber 150 may further decrease the average velocity of the bulk material as it moves through the hydraulic spray nozzle 100 in the flow direction F.

In one form, the expansion chamber 150 may be constructed in a modular manner such that it is made up of numerous repeating expansion chamber sub-sections 150A, 150B. In one form, the expansion chamber 150 sub-sections 150A, 150B may be constructed to have substantial similarity in vane 140, overall length, or other flowpath attributes. In another form, (not shown), through variations in length, vane 140 position, vane 140 camber or the like, each of the sub-sections 150A, 150B may be constructed to vary slightly from one another in order to customize the flow of bulk material, such as for particular spraying applications.

The converging nozzle 160 is fluidly downstream of the expansion chamber 150 and reduces the cross-sectional area of the flowpath along the flow direction F. The diameter of the converging nozzle 160 rapidly decreases in the flow direction along converging portions 162, 164 to a final diameter with a sharp edged exit at the outlet 170. Without being bound by theory, it is believed that the converging nozzle 160 promotes a more plug-based (rather than parabolic) flow profile for the slurry that passes through the outlet 170 in the flow direction. As a result, the shear forces that otherwise detract from the forward momentum of the slurry are reduced, therefore allowing the flow to remain coherent for a longer time, which in turn results in attainment of a greater discharge distance of the slurry as it leaves the hydraulic spray nozzle 100. Serendipitously, the rapid convergence of the fluid (that is to say, bulk material) through the converging nozzle 160, coupled with a sharp exit edge at the outlet 170, helps to make the velocity profile—which is already made uniform by the combined action of the diffuser cone 130 and expansion chamber 150 as previously discussed—even more uniform. Within the present disclosure, the term "rapid" and its variants when used to describe convergence or related decreases in flowpath area, means if a length $L_C$ of the converging nozzle 160 (which is from when the hydraulic spray nozzle 100 begins its reduction in diameter to where the slurry exits the hydraulic spray nozzle 100) and an inlet diameter $D_I$ (which is the diameter before this reduction begins), then an aspect ratio AR (which is defined as $L_C/D_I$) should be between about 0.5 and 2. Likewise, the term "sharp" when used to define an edge E that makes up the outlet 170, means that beyond a final minimum exit diameter $D_E$, there should not be any additional cylindrical or diverging section of the hydraulic spray nozzle 100 in contact with the flowpath of the fluid that is being discharged. The maximum permissible radius on the final edge E should be less than 2% of the final exit diameter $D_E$. As previously discussed, although not shown, in one form the vanes 140 may be disposed within the converging nozzle 160.

In one form (not shown) the outlet 170 may be shaped or otherwise configured to increase the discharge coefficient as a way to increase the discharge distance even farther. Significantly, the outlet 170 and the converging portions 162, 164 ensure that there is no cylindrical component to the flowpath that is defined in the converging nozzle 160. This, coupled with the sharp edged exit that is formed at the outlet 170, helps promote the higher discharge coefficient and ensuing discharge distance. Moreover, the diameter of the outlet 170 may be sized for the particular pressure and flow characteristics of the slurry pump 320.

As mentioned previously, in one form, the vanes 140, adapter 120 and diffuser cone 130 may be formed into a singular, integral part (such as that made from an aluminum extrusion or the like) as part of one-piece housing. In the alternative version depicted in FIGS. 2 and 3, the separately-formed outer tube 180 acts as the housing with which to contain the remaining components of the hydraulic spray nozzle 100. In this alternative version, the outer tube 180 provides structural support to the hydraulic spray nozzle 100. It will be appreciated that both construction variants are within the scope of the present disclosure. Moreover, and regardless of whether such construction is through a separated-formed outer tube 180 or as part of an integrally-formed singular component, such housing may act as a substantially fluid-tight seal to keep the slurry from inadvertent discharge from locations other than through the outlet 170.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Likewise, it is further noted that terms like "preferably", "commonly" and "typically", when utilized herein, are not utilized to limit the scope of the claims or to imply that certain features are critical, essential, or even important to the structure or function of the claims. Rather, these terms are merely intended to identify particular aspects of an embodiment of the present disclosure or to emphasize alternative or additional features that may or may not be utilized in a particular embodiment of the present disclosure.

Within the present disclosure, one or more of the following claims may utilize the term "wherein" as a transitional phrase. For the purposes of defining features discussed in the present disclosure, this term is introduced in the claims as an open-ended transitional phrase that is used to introduce a recitation of a series of characteristics of the structure and should be interpreted in like manner as the more commonly used open-ended preamble term "comprising."

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present context, if a claim recites that attributes of the one or more vanes 140 include at least one of vane placement, vane length and vane hydrodynamic profile, and if such vane or vanes are configured to have a particular vane placement alone, a particular vane length alone, a particular vane hydrodynamic profile alone or a combination of any one, two or three of these particulars, then such vane satisfies the claim.

Within the present disclosure, the following claims are not written in means-plus-function format and are not intended to be interpreted based on 35 USC 112(f) unless and until such claim limitations expressly use the phrase "means for" followed by a statement of function void of further structure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hydraulic spray nozzle for use in a bulk material dispersing system, the hydraulic spray nozzle comprising:

an outer tube defining a housing; and a series of components each arranged within the outer tube and defining a flowpath within the outer tube, the series of components disposed within the outer tube, the series of components comprising:

an inlet;

a diffuser cone in downstream fluid communication with the inlet;

an expansion chamber, comprising a plurality of modular subsections positionable relative to one another to provide a customizable flow profile, in a downstream fluid communication with the diffuser cone;

a converging nozzle in downstream fluid communication with the expansion chamber;

an outlet in downstream fluid communication with the converging nozzle; and at least one vane disposed within at least one of the diffuser cone, the expansion chamber and the converging nozzle, the at least one vane extending toward and spaced from a flowpath centerline of the flowpath, the series of components fluidly cooperative with one another such that upon a flow of bulk material through the flowpath along a flow direction, a tangential velocity profile that is present within the flow as a result of the bulk material being conveyed to the hydraulic spray nozzle from a bulk material dispersing system is reduced.

2. The hydraulic spray nozzle of claim 1, wherein the at least one vane defines a partial radial profile.

3. The hydraulic spray nozzle of claim 1, wherein the expansion chamber comprises a plurality of repeating expansion chamber sub-sections that are substantially aligned with one another along the flow direction.

4. The hydraulic spray nozzle of claim 3, wherein each of the plurality of repeating expansion chamber sub-sections define a substantial similarity in at least one of vane placement, vane length, and vane hydrodynamic profile.

5. The hydraulic spray nozzle of claim 3, wherein each of the plurality of repeating expansion chamber sub-sections define at least one variation in at least one of vane placement, vane length, and vane hydrodynamic profile.

6. The hydraulic spray nozzle of claim 1, wherein the diffuser cone increases the cross-sectional area of the hydraulic spray nozzle along a flow direction in a non-linear, non-constant manner.

7. The hydraulic spray nozzle of claim 1, further comprising an adapter in upstream fluid communication with the inlet.

8. The hydraulic spray nozzle of claim 1, wherein a portion of the flowpath defined by the diffuser cone, expansion chamber and converging nozzle have the at least one vane disposed therein.

9. The hydraulic spray nozzle of claim 1, wherein the at least one vane comprises a plurality of vanes each disposed circumferentially about the flowpath centerline.

10. The hydraulic spray nozzle of claim 9, wherein the plurality of vanes define a partial radial profile.

11. The hydraulic spray nozzle of claim 1, wherein the outlet defines a sharp edge and the converging nozzle defines a rapid convergence.

12. The hydraulic spray nozzle of claim 1, wherein the at least one vane includes a plurality of vanes aligned with one another along the flow direction.

13. A hydroseeding system comprising:

a hydraulic spray nozzle;

a raw material hopper configured to contain a slurry, a motor;

at least one piping run; and a pump responsive to power from the motor to convey the slurry with the at least one piping run to the a hydraulic spray nozzle, wherein the hydraulic spray nozzle comprises:

an outer tube defining a housing; and a series of components each arranged within the outer tube and defining a flowpath within the outer tube, the series of components disposed within the outer tube, the series of components comprising:

an inlet;

a diffuser cone in downstream fluid communication with the inlet;

an expansion chamber, comprising a plurality of modular subsections positionable relative to one another to provide a customizable flow profile, in a downstream fluid communication with the diffuser cone;

a converging nozzle in downstream fluid communication with the expansion chamber;

an outlet in downstream fluid communication with the converging nozzle; and at least one vane disposed within at least one of the diffuser cone, expansion chamber and converging nozzle, the at least one vane extending toward and spaced from a flowpath centerline of the flowpath, the series of components fluidly cooperative with one another and the hydraulic spray nozzle, raw material hopper, pump, motor and at least one piping run such that upon a flow of bulk material through the hydraulic spray nozzle, a tangential velocity profile that is present within the flowpath is reduced.

14. The hydroseeding system of claim 13, wherein the at least one vane defines a partial radial profile.

15. The hydroseeding system of claim 13, further comprising a discharge boom fluidly downstream of the raw material hopper, pump and motor and fluidly upstream of the hydraulic spray nozzle.

* * * * *